United States Patent
Pham et al.

(10) Patent No.: US 9,338,410 B2
(45) Date of Patent: May 10, 2016

(54) REMOTE STREAMING

(75) Inventors: Lan Lu Pham, Irving, TX (US); Peter J. Swamidas, Irving, TX (US); Vivekanand C. Pachaiyappan, Little Elm, TX (US); Yohan Rajan, Flower Mound, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 733 days.

(21) Appl. No.: 13/490,498

(22) Filed: Jun. 7, 2012

(65) Prior Publication Data
US 2013/0329050 A1 Dec. 12, 2013

(51) Int. Cl.
| | | |
|---|---|---|
| *G06F 15/16* | (2006.01) | |
| *H04N 7/18* | (2006.01) | |
| *H04L 29/06* | (2006.01) | |
| *H04L 12/28* | (2006.01) | |
| *H04N 21/41* | (2011.01) | |
| *H04N 21/4223* | (2011.01) | |
| *H04N 21/4405* | (2011.01) | |
| *H04N 21/6437* | (2011.01) | |

(52) U.S. Cl.
CPC ............ *H04N 7/181* (2013.01); *H04L 12/2803* (2013.01); *H04L 63/029* (2013.01); *H04L 63/0428* (2013.01); *H04L 65/4084* (2013.01); *H04N 21/4126* (2013.01); *H04N 21/4223* (2013.01); *H04N 21/4405* (2013.01); *H04N 21/6437* (2013.01); *H04L 65/608* (2013.01)

(58) Field of Classification Search
CPC ...................... H04L 29/12066; H04L 61/1511; H04L 29/12009; H04L 29/06; H04L 29/08072
USPC ......................................................... 709/245
See application file for complete search history.

(56) References Cited

U.S. PATENT DOCUMENTS

| | | | | |
|---|---|---|---|---|
| 8,754,926 B1* | 6/2014 | Gossweiler | .............. | H04N 7/15 348/14.08 |
| 2006/0173846 A1* | 8/2006 | Omae | ...................... | G06F 21/35 |
| 2010/0097473 A1* | 4/2010 | Park | .................... | H04N 5/23203 348/159 |
| 2010/0191863 A1* | 7/2010 | Wing | ................ | H04L 29/12066 709/245 |
| 2010/0281518 A1* | 11/2010 | Bugenhagen | ........... | H04L 63/10 726/3 |
| 2011/0030016 A1* | 2/2011 | Pino, Jr. | .............. | H04L 12/2818 725/80 |
| 2011/0173249 A1* | 7/2011 | Lee | ...................... | H04W 72/005 709/203 |
| 2012/0098969 A1* | 4/2012 | Wengrovitz | ........... | H04N 7/185 348/159 |
| 2013/0152153 A1* | 6/2013 | Weiser | ................ | H04L 63/0236 726/1 |

* cited by examiner

*Primary Examiner* — Emmanuel L Moise
*Assistant Examiner* — Mahran Abu Roumi

(57) ABSTRACT

Method, device, and storage medium for logging on to a network that provides a streaming service for content pertaining to video cameras located at customers' premises; attempting to receive streaming content from a video camera located at a customer's premises based on one of a request to open a port on a routing device located at the customer's premises or a request to open a pinhole on a routing device located at a location remote to the customer's premises; and determining whether a success or a failure occurred as to receiving the streaming content from the video camera located at the customer's premises.

20 Claims, 17 Drawing Sheets

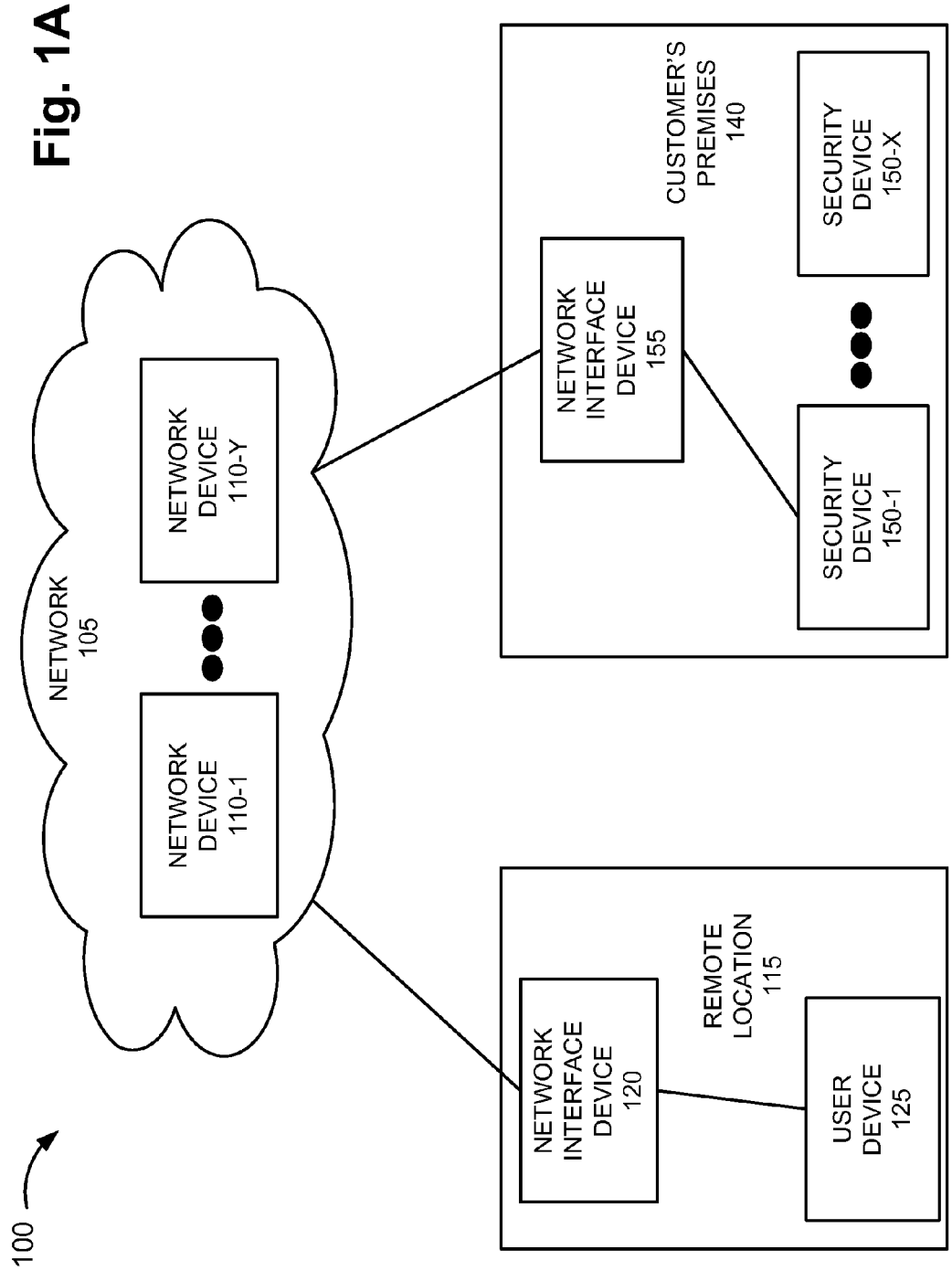

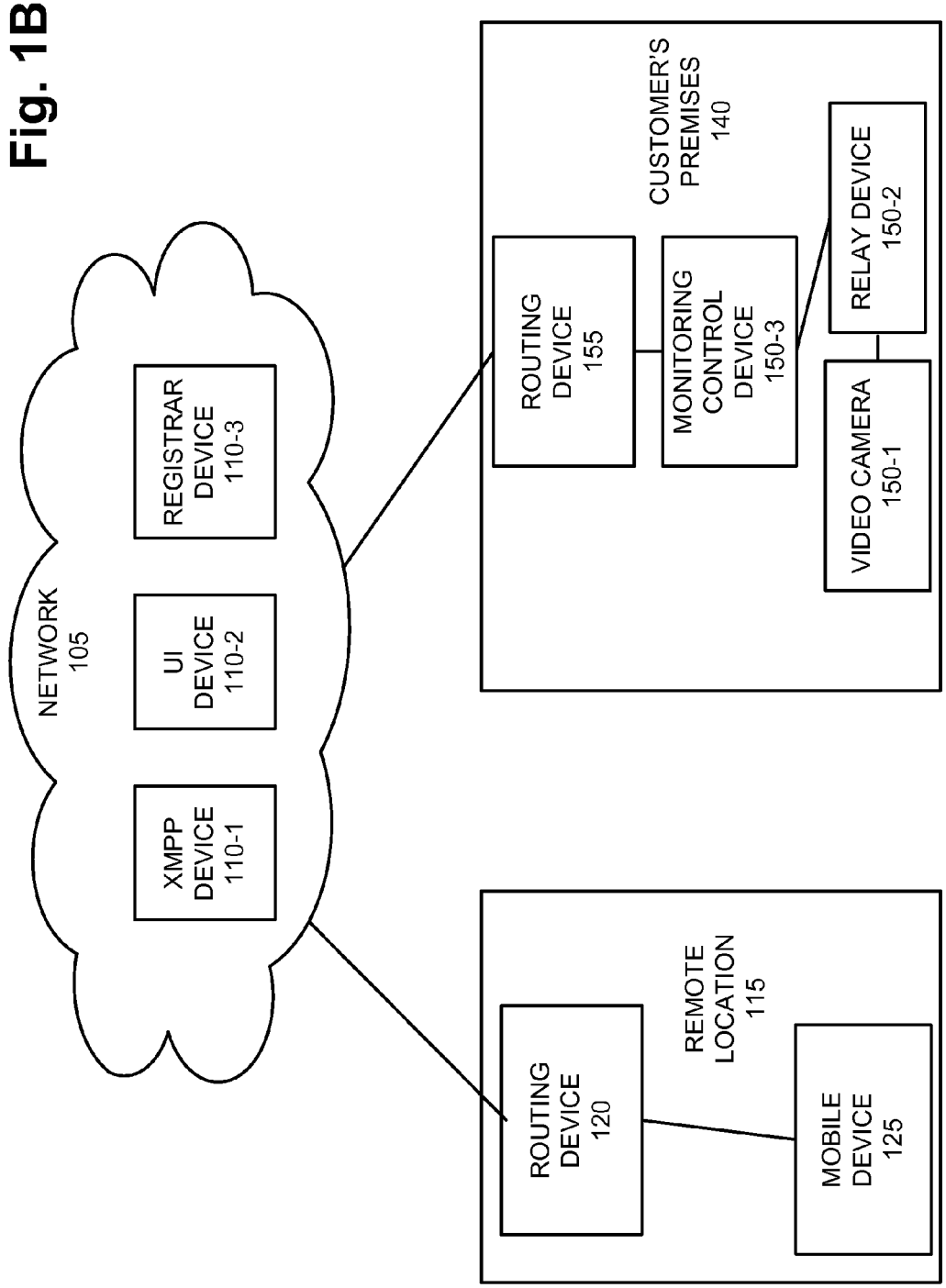

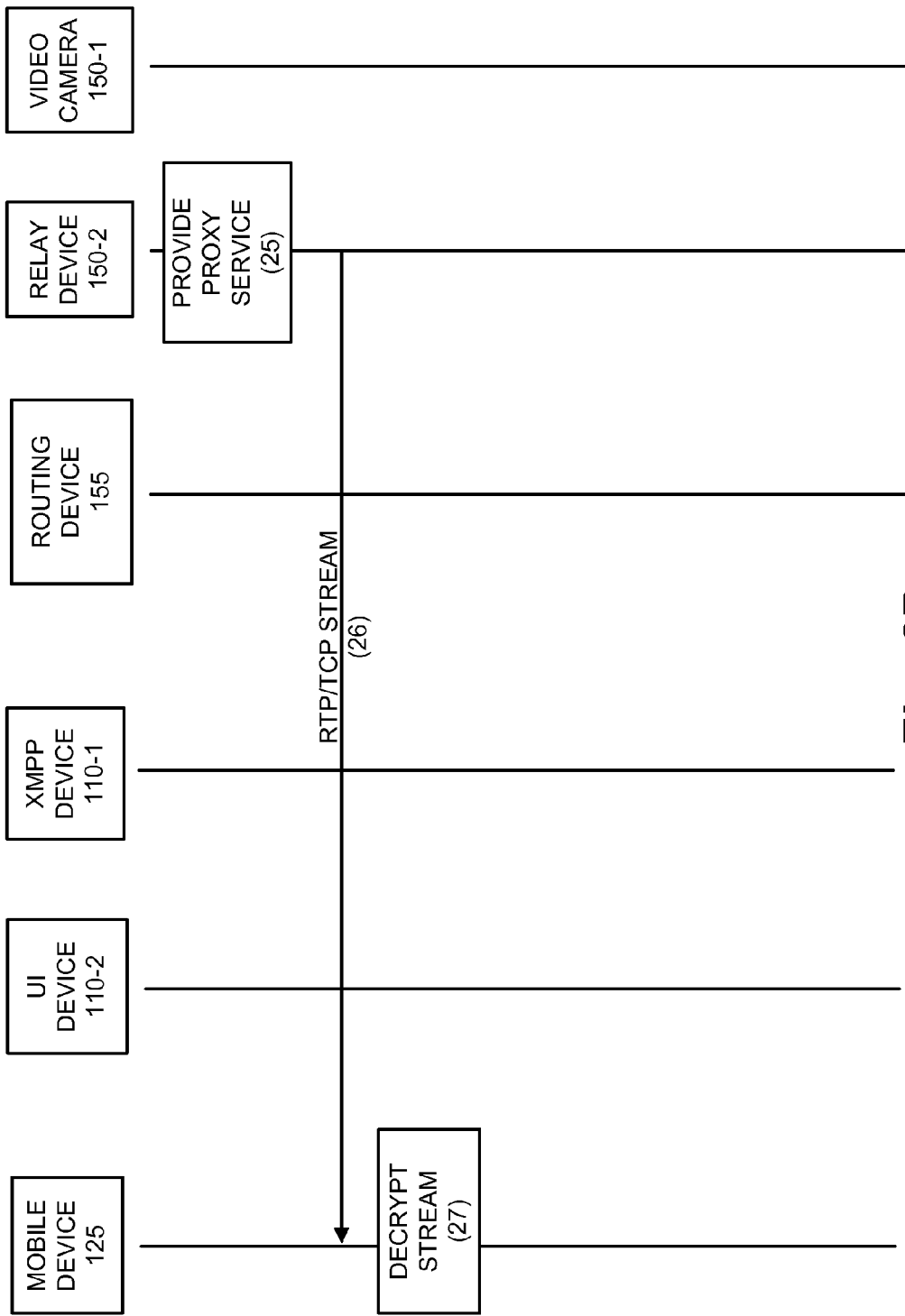

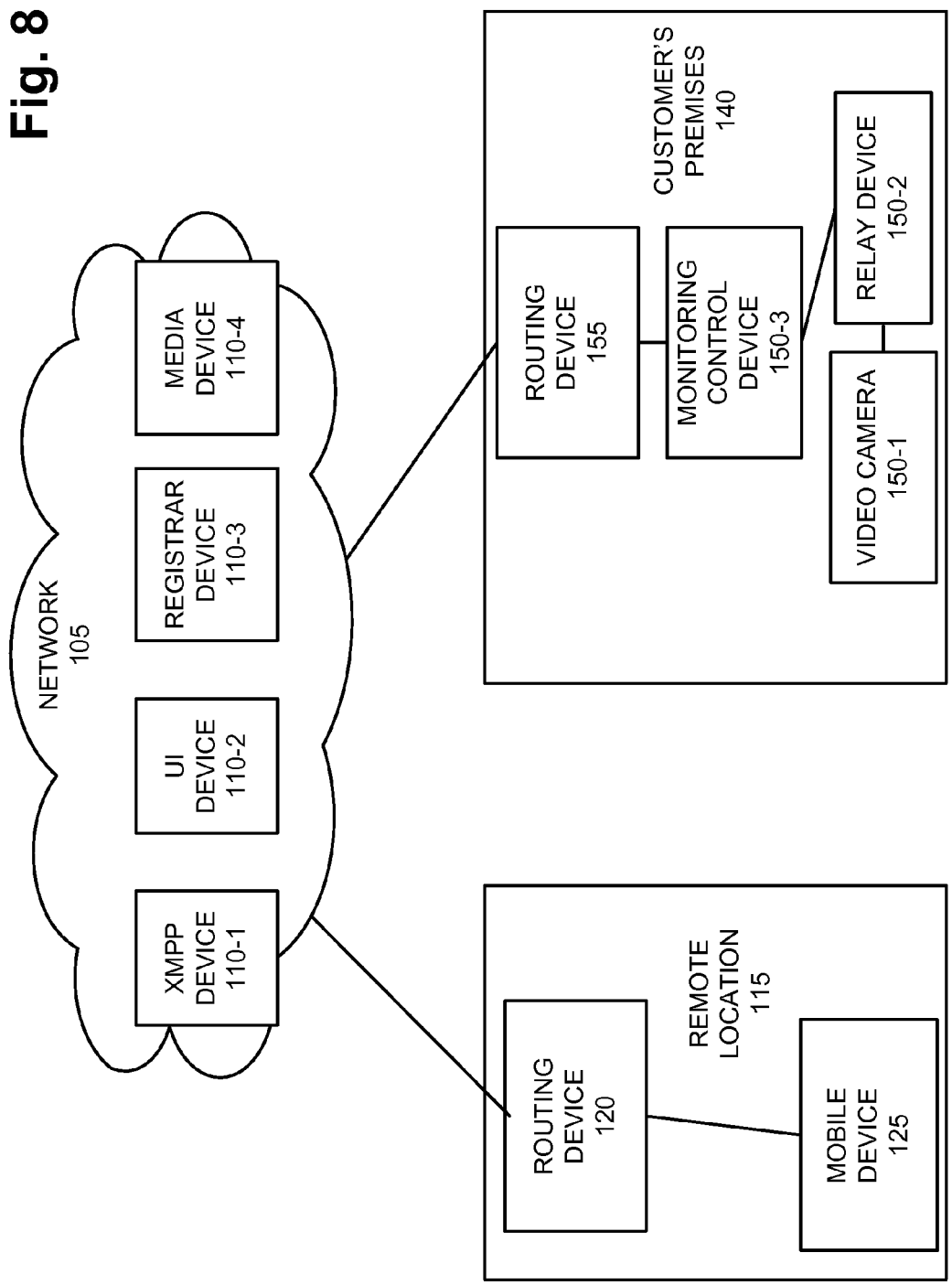

REMOTE STREAMING

BACKGROUND

Security systems may include camera systems to provide an audio/video presence at a particular location. Users may receive streaming audio/video from these camera systems. As users of camera-based security systems continue to increase, network devices that deliver streaming services to users will become overloaded, which will negatively impact quality of service.

DESCRIPTION OF THE DRAWINGS

FIG. 1A is a diagram illustrating an exemplary environment in which an exemplary embodiment of a streaming system may be implemented;

FIG. 1B is a diagram illustrating exemplary elements for the devices illustrated in FIG. 1A;

FIGS. 6A-6D are diagrams illustrating an exemplary messaging flow performed by an exemplary embodiment of the streaming system;

FIG. 8 is a diagram illustrating exemplary elements for the devices illustrated in FIG. 1A.

DETAILED DESCRIPTION

Figure 2A:
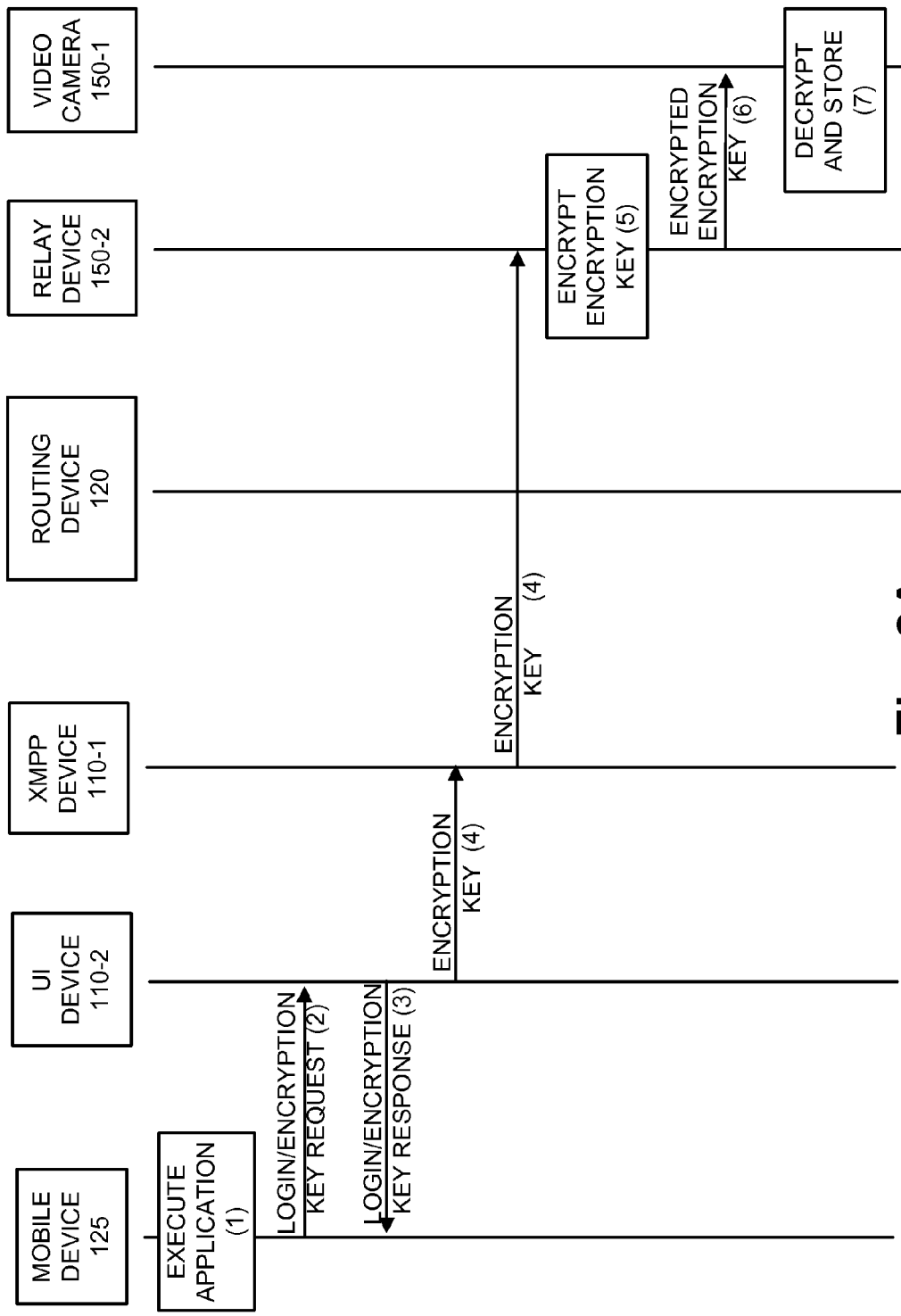
FIGS. 2A-2C are diagrams illustrating an exemplary messaging flow performed by an exemplary embodiment of the streaming system.

The following detailed description refers to the accompanying drawings. The same reference numbers in different drawings may identify the same or similar elements.

According to an exemplary embodiment, a streaming system provides a remote streaming service in relation to a security system located at a customer's premises. According to an exemplary embodiment, the streaming system separates stream signaling from stream content. That is, for example, in contrast to interleaving the signaling and the content, the streaming system uses separate connections and different protocols. According to an exemplary embodiment, the streaming system uses the Real Time Streaming Protocol (RTSP) over the Extensible Messaging and Presence Protocol (XMPP) for stream signaling. According to an exemplary embodiment, the streaming system uses the Real Time Transport Protocol (RTP) for streaming content. According to an exemplary embodiment, a user device located at a remote location opens a pinhole (e.g., associated with a remote wireless access device) to receive the streaming content from the security system located at the customer's premises.

According to an exemplary embodiment, a streaming system provides a remote streaming service in relation to a security system located at a customer's premises. According to an exemplary embodiment, the streaming system separates stream signaling from stream content. According to an exemplary embodiment, the streaming system uses the Real Time Streaming Protocol (RTSP) over the Extensible Messaging and Presence Protocol (XMPP) for stream signaling. According to an exemplary embodiment, the streaming system uses the Real Time Transport Protocol (RTP) for streaming content. According to an exemplary embodiment, a user device located at a remote location opens a port associated with a routing device at the customer's premises.

While exemplary embodiments provided in this description may be implemented based on the use of a particular protocol, network architecture, platform, etc., such implementations are not intended to be restrictive or provide an exhaustive treatment, as such. In other words, the embodiments described herein may be implemented using other suitable protocols, network architectures, platforms, etc., which may not be specifically described.

FIG. 1A is a diagram illustrating an exemplary environment in which an exemplary embodiment of the streaming system may be implemented. As illustrated, an environment 100 includes a network 105, a remote location 115, and a customer's premises 140. Network 105 includes network devices 110-1 through 110-Y, in which Y>1 (also referred to collectively as network devices 110 and individually as network device 110). Remote location 115 includes a network interface device 120 and a user device 125. Customer's premises 140 includes security devices 150-1 through 150-X, in which X>1 (also referred to collectively as security devices 150 and individually as security device 150), and network interface device 155.

The number of devices and networks, and the configuration in environment 100 are exemplary. According to other embodiments, environment 100 may include additional devices, fewer devices, different devices, and/or differently arranged devices, than those illustrated in FIG. 1. Additionally, or alternatively, environment 100 may include an additional network and/or a differently arranged network, than those illustrated in FIG. 1.

According to other embodiments, a single device in FIG. 1A may be implemented as multiple devices. Alternatively, for example, multiple devices in FIG. 1A may be implemented as a single device. For example, multiple devices of network devices 110 may be implemented as a single device. A device may be implemented according to one or multiple network architectures (e.g., a client device, a server device, a peer device, a proxy device, or a combination thereof).

Also, according to other embodiments, one or more functions and/or processes described as being performed by a particular device may be performed by a different device, or some combination of devices, which may or may not include the particular device.

Environment 100 may be implemented to include wired and/or wireless connections among the devices and networks illustrated. A connection may be direct or indirect and may involve intermediary device(s) and/or network(s) not illustrated in FIG. 1A. Additionally, the number and the arrangement of connections between the devices and the networks are exemplary.

Network 105 includes a network that provides security management services. For example, users may subscribe to a home monitoring security service provided by network 105. Network devices 110 include network devices that provide, for example, user interfaces, authentication and authorization, and communication to security devices located at a customer's premises. According to an exemplary embodiment, network devices 110 are implemented as a cloud service. One or multiple network devices of network devices 110 may be implemented as an application server device. Network 105 may be implemented as a cloud service.

Remote location 115 is a location remote from the customer's premises 140. Network interface device 120 includes a device that interfaces with network 105. For example, network interface device 120 may be implemented as a wireless router. Network interface device 120 may provide WiFi or local area network (LAN) access, and Internet service. User device 125 includes a mobile device. For example, user device 125 may be implemented as a smartphone, a tablet device, a netbook, a laptop computer, or the like. User device 125 may be implemented as another type of device, such as, for example, a set top box and a television or a smart television.

Customer's premises 140 is a location at which security devices 150 are located. For example, customer's premise 140 may be the user's residence, place of business, etc. Security devices 150 include devices that provide security services. For example, security devices 150 may include video cameras, sensors, and a controller device. Network interface device 155 includes a device that interfaces with network 105. For example, network interface device 155 may be implemented as a router (e.g., an in-home router device, a broadband router, a wireless router, etc.). Customer's premise 140 may include other devices not specifically illustrated in FIG. 1A, such as an optical network termination device, a media server device, etc.

According to an exemplary process, assume that security devices 150 include a video camera and a user of user device 125 wishes to receive streaming video of the user's premises 140 while at remote location 115. The user logs into network 105 via user device 125. The user requests video streaming. Network 105 shares an encryption key with user device 125 and the video camera.

User device 125 obtains the network address (e.g., an IP address and port) of the video camera from network 105. For example, network device 110 requests the network address from the video camera or the network address of another security device 150 that provides access to the video camera.

User device 125 initiates signaling with security device 150 to establish a media session via network 105. For example, user device 125 transmits RTSP requests (e.g., Describe, Setup) to establish a media session. Network 105 may package the RTSP requests according to the XMPP.

User device 125 opens a media pinhole in relation to network interface device 120. User device 125 transmits an RTSP request (e.g., Play) to security device 150 via network 105. The video camera encrypts the streaming content and transmits the stream to user device 125 via network 105 and the opened media pinhole. For example, the video camera streams the content as an RTP/User Datagram Protocol (UDP) encrypted stream. User device 125 decrypts the encrypted RTP/UDP stream and provides a user interface to allow the user to watch the streaming content.

FIG. 1B is a diagram illustrating exemplary elements (e.g., logic) for the devices illustrated in FIG. 1A. As illustrated, network 105 includes XMPP device 110-1, a UI device 110-2, and a registrar device 110-3. Remote location includes a routing device 120 and a mobile device 125. Customer's premises 140 includes a video camera 150-1, a relay device 150-2, a monitoring control device 150-3, and a routing device 155.

XMPP device 110-1 includes a network device that acts as an intermediary device for communications between mobile device 125 and relay device 150-2. According to an exemplary embodiment, XMPP device 110-1 packages communications (e.g., stream signaling and video content) according to the XMPP.

UI device 110-2 includes a network device that provides access to security services provided by network 105. For example, UI device 110-2 provides interfaces to allow a user to sign-on to the security service, manage encryption, and provide access to XMPP device 110-1.

Registrar device 110-3 includes a network device that obtains and stores network address and port information. For example, registrar device 110-3 obtains the network addresses and ports of mobile device 125 and relay device 150-2 based on a registration process, as described further below. This information is used to setup a media session between mobile device 125 and video camera 150-1.

Routing devices 120 and 155 include any suitable routing device, such as wireless routers, etc. Mobile device 125 includes a smartphone or the like. Mobile device 125 includes a web browser, an RTSP player, and an RTSP proxy. The RTSP proxy includes a signaling proxy and a streaming proxy.

Video camera 150-1 includes a video camera device that captures video. Relay device 150-2 connects to security monitoring devices, such as, video camera 150-1, and acts as a relay between security monitoring devices and monitoring control device 150-3. Monitoring control device 150-3 includes a device that controls the other security monitoring devices of the security system at the customer's premises 140.

Figure 2B:
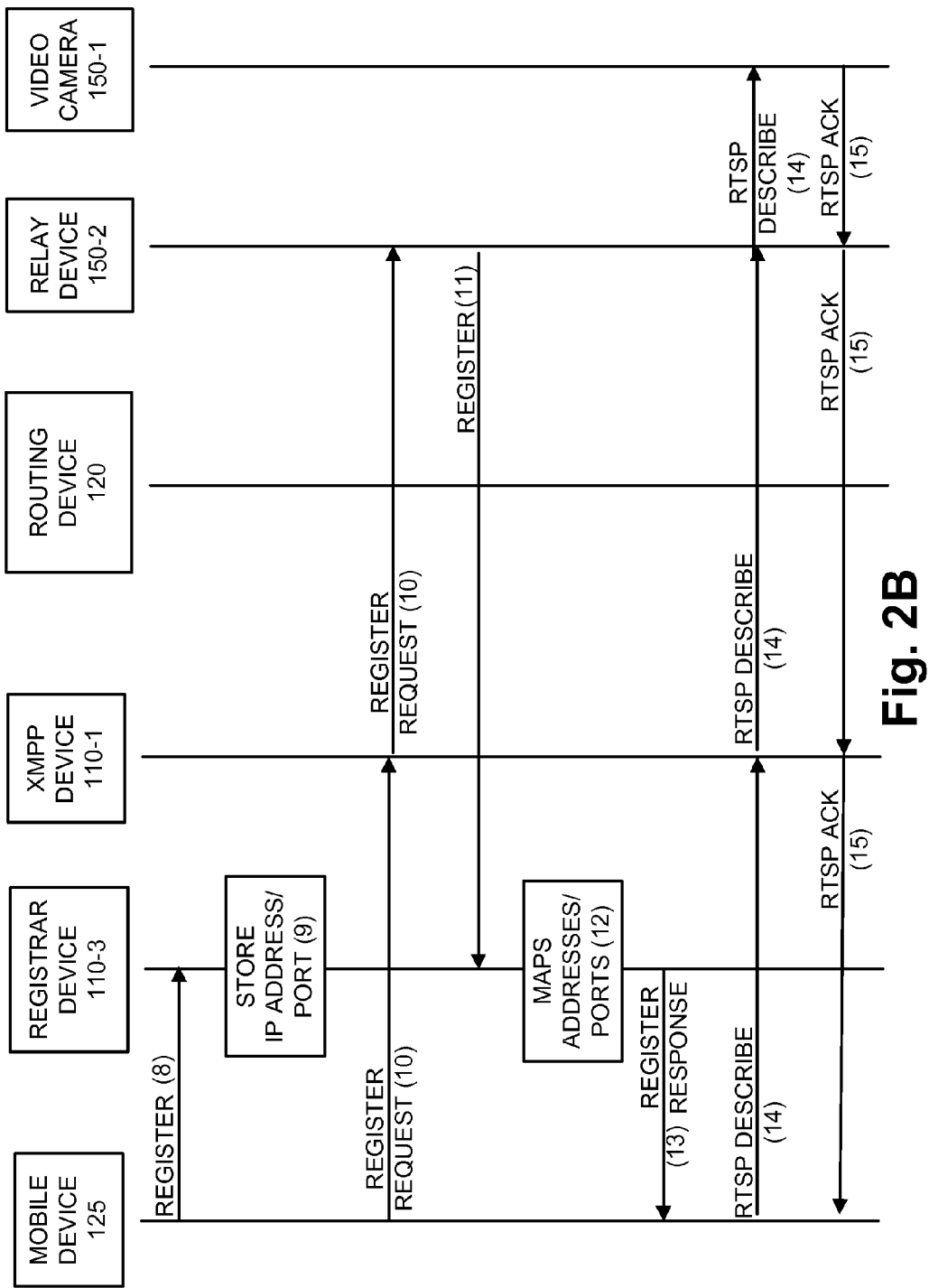
Figure 2C:
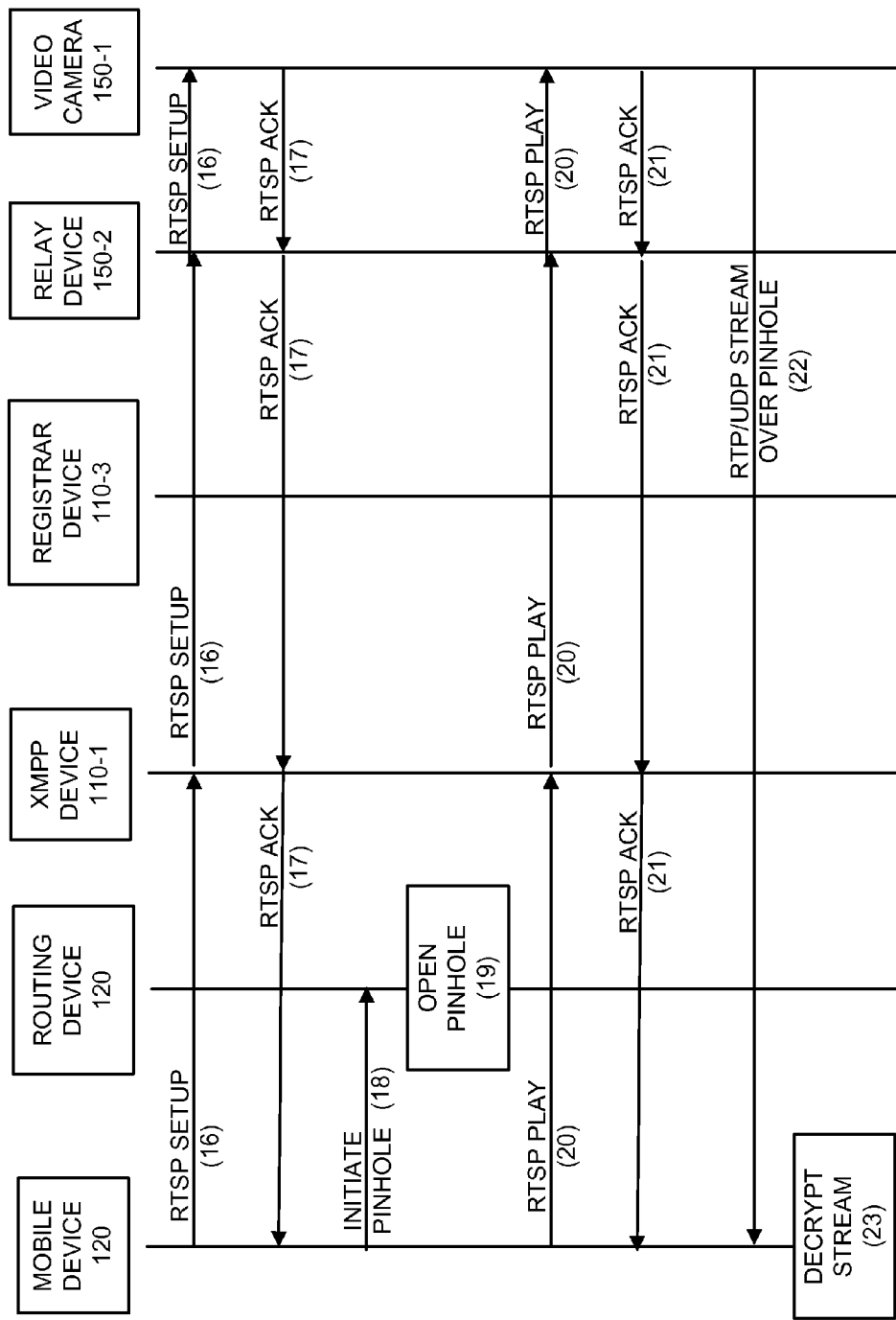

FIGS. 2A-2C are diagrams illustrating an exemplary messaging flow performed by an exemplary embodiment of the streaming system. The exemplary process is described in relation to the elements illustrated in FIG. 1B.

The messages described and the data or information included therein are exemplary. According to other implementations, the streaming system may use different types of messages and/or include different data or information. Additionally, or alternatively, although the exemplary process describes a particular device performing a step or an act of the process, the step or act may, alternatively be performed by another device, or some combination of devices.

According to this scenario, assume that the user of mobile device 125, while at remote location 115, wishes to receive streaming content from video camera 150 located at the user's premises 140. According to other scenarios, the user of mobile device 125 may view the streaming content via a server (e.g., a Web server device).

Referring to FIG. 2A, in step (1), the user executes software (e.g., a browser) that allows the user to connect to UI device 110-2.

In step (2), mobile device 125 transmits a request to obtain login information for XMPP device 110-1 and an encryption key. In step (3), UI device 110-2 transmits the login information and an encryption key to mobile device 125.

In step (4), UI device 110-2 transmits the encryption key to relay device 150-2 via XMPP device 110-1. In step (5), relay device 150-2 encrypts the encryption key with a predefined key. In step (6), relay device 150-2 transmits the encrypted encryption key to video camera 150-1. In step (7), video camera 150-1 decrypts the encrypted key and stores the encrypted key.

Referring to FIG. 2B, in step (8), mobile device 125 connects to registrar device 110-3 and transmits its IP address and port number in a registration message. In step (9), registrar 110-3 stores this information. In step (10), mobile device 125 connects to XMPP device 110-1 using the login information obtained in step (3). In step (10), mobile device 125 transmits a register request to XMPP 110-1. The register request includes an identifier pertaining to relay device 150-2. As illustrated, XMPP device 110-1 transmits a register request to relay device 150-2. In step (11), in response to the register request, relay device 150-2 transmits a registration message that includes relay device 150-2's IP address and port number. In step (12), registrar device 110-3 maps the IP address and port number of mobile device 125 with the IP address and port number of relay device 150-2. In step (13), registrar device 110-3 transmits a register response to mobile device 125. The register response includes the IP address and port number of relay device 150-2.

Referring to FIGS. 2B and 2C, steps (14) through (17), mobile device 125 and video camera 150-1 exchange RTSP messages to establish a media session for video streaming from video camera 150-1 to mobile device 125. As illustrated, mobile device 125 transmits Describe and Setup request messages of the RTSP. As illustrates, the RTSP messages are transmitted via XMPP device 110-1 and relay device 150-2. XMPP device 110-1 packages the RTSP messages in the XMPP.

As illustrated in FIG. 2C, in step (18), mobile device 120 transmits a request to open a media pinhole in relation to routing device 120 of remote location 115. In response, in step (19), routing device 120 opens a pinhole. In step (20), mobile device 125 transmits an RTSP Play request message to video camera 150-1 and, in step (21), video camera 150-1 transmits an acknowledgement.

In step (22), video camera 150-1 encrypts a video stream and transmits the video stream to mobile device 120 using RTP/UDP and via the media pinhole established in step (19). In step (23), mobile device 125 decrypts the video stream using the encryption key obtained in step (3). The user of mobile device 125 watches the video stream via the application. Although not illustrated, once the user is finished watching the video stream, mobile device 125 transmits an RTSP Teardown message to video camera 150-1 in order to stop the streaming video, which is subsequently acknowledged by an RTSP ACK message from video camera 150-1.

While FIGS. 2A-2C are messaging diagrams pertaining to an exemplary process performed by an exemplary embodiment of the streaming system, according to other scenarios, the message(s) transmitted and/or received may be different, and/or the step(s) or act(s) described may be different.

Figure 3:
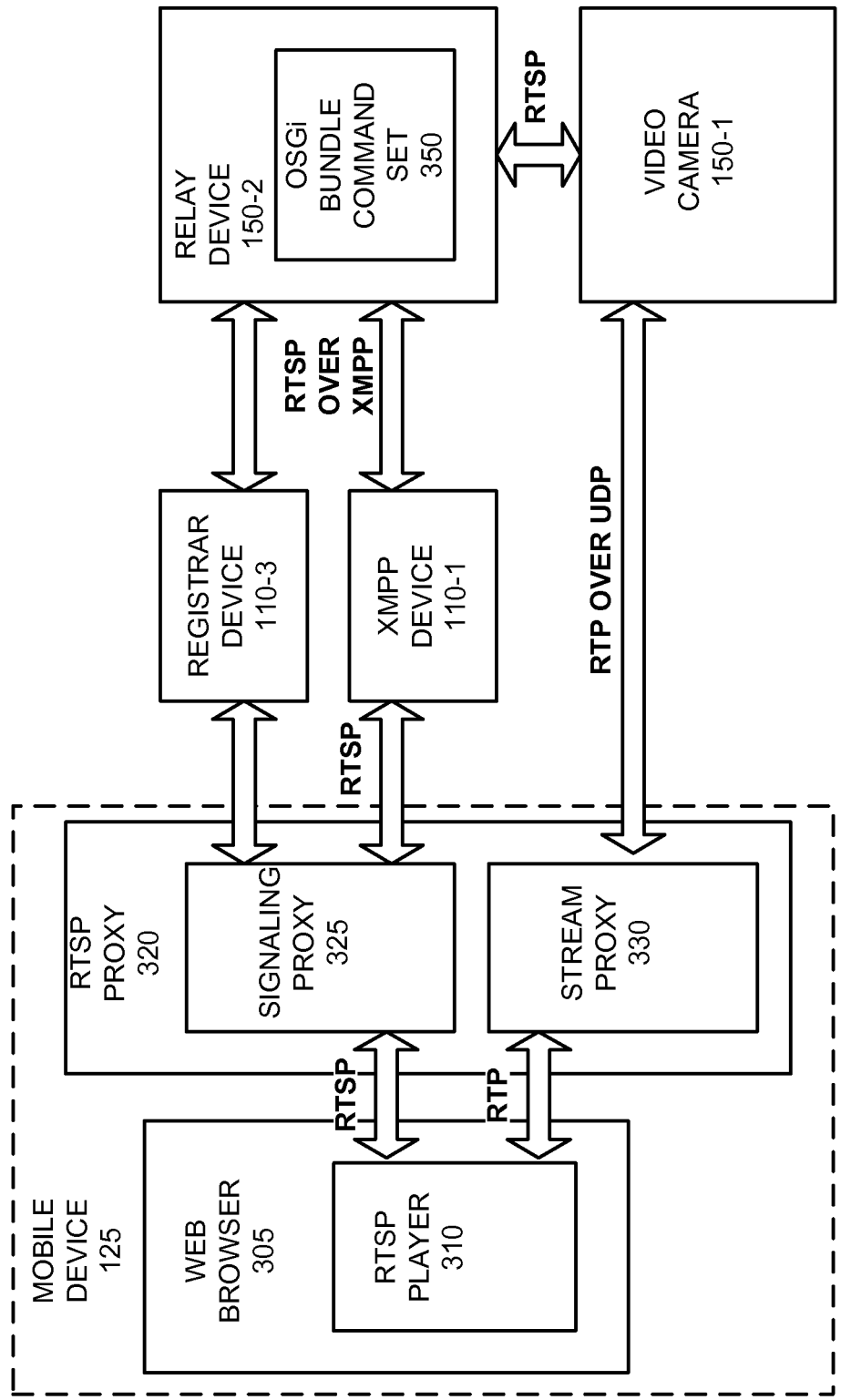
FIG. 3 is a diagram illustrating an exemplary embodiment of functional components of a mobile device and a relay device.

FIG. 3 is a diagram illustrating an exemplary embodiment of functional components of mobile device 125 and relay device 150-2. As illustrated, mobile device 125 includes a web browser 305 that includes an RTSP player 310. RTSP player 310 is capable of playing video streams from video camera 150-1. Mobile device 125 includes an RTSP proxy 320 that includes a signaling proxy 325 and a stream proxy 330. Signaling proxy 325 manages communications pertaining to signaling. Stream proxy 330 manages communications pertaining to the video stream. Relay device 150-2 includes a JAVA module, such as Open Services Gateway initiative (OSGi) Bundle Command Set 350, to manage communications.

Figure 4:
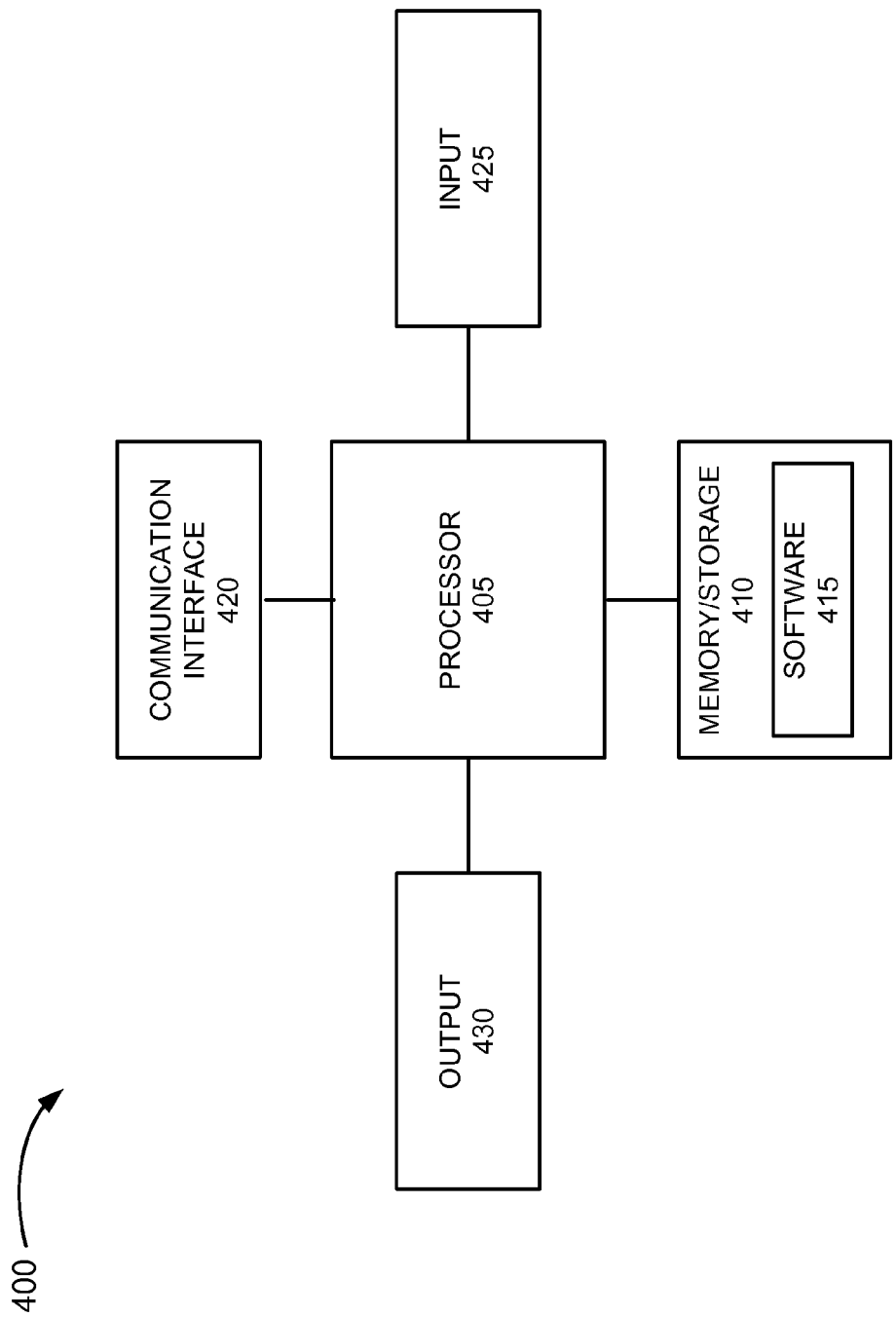
FIG. 4 is a diagram illustrating exemplary components of a device that may correspond to one or more of the devices previously depicted.

FIG. 4 is a diagram illustrating exemplary components of a device 400 that may correspond to one or more of the devices depicted in the previous Figures. As illustrated, according to an exemplary embodiment, device 400 includes a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. For example, network devices 110 and security device 150 (e.g., relay device 150-2) may be implemented with one or more program(s) and/or application(s). Additionally, for example, with reference to user device 125, one or more program(s) and/or application(s) may be used to display user interfaces, communicate with network 105, etc. Additionally, for example, other devices may be implemented with software 415 to provide a function and/or a process described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform a process or a function described herein based on hardware (processor 405, etc.).

Figure 5A:
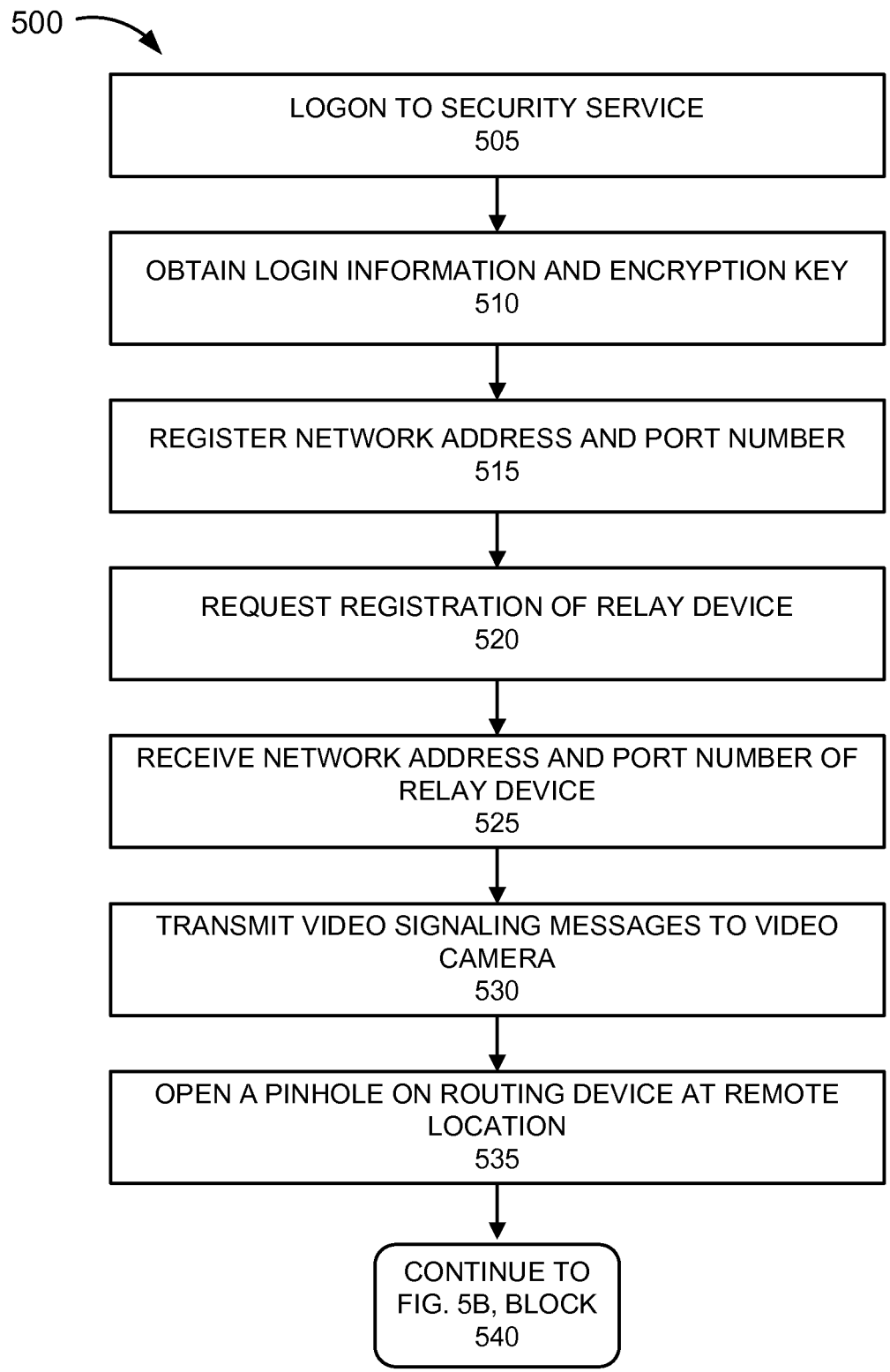
FIGS. 5A and 5B are flow diagrams illustrating an exemplary process pertaining to an exemplary embodiment of the streaming system.
Figure 5B:
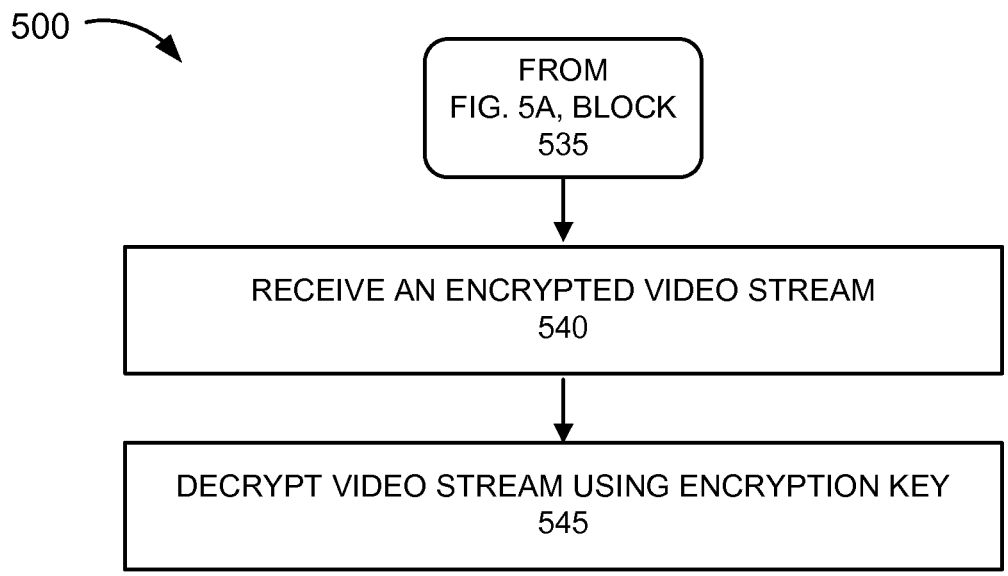

FIGS. 5A and 5B are flow diagrams illustrating an exemplary process pertaining to an exemplary embodiment of the streaming system. A step described in process 500 is performed by one of the devices illustrated in FIG. 1A. For example, processor 405 of user device 125 may execute software 415 to perform the step described.

Process 500 begins with logging on to a security service (block 505). For example, user device 125 executes software (e.g., an application). User device 125 establishes a communication link with UI device 110-2 of network 105 and logs into UI device 110-2.

In block 510, an encryption key and login information is obtained. For example, user device 125 request login information for XMPP device 110-1 and an encryption key. User device 125 obtains the login information and the encryption key.

In block 515, the network address and port number of the user device is registered. For example, user device 125 establishes a communication link with registrar device 110-3. User device 125 registers its network address and port number with registrar device 110-3.

In block 520, a request for registration of a relay device is transmitted. For example, user device 125 establishes a communication link with XMPP device 110-1 and logs into XMPP device 110-1 using the login information. User device 125 transmits a request to XMPP device 110-1 to invoke relay device 150-2 to register with XMPP device 110-1.

In block 525, the network address and port number of the relay device is received. For example, XMPP device 110-1 transmits the request for registration to relay device 150-2. In response, relay device XMPP device 110-1 transmits the request for registration to relay device 150-2. In response, relay device 150-2 establishes a communication link with registrar device 110-3. Relay device 150-2 registers its network address and port number with registrar device 110-3. In response, registrar device 110-3 transmits a response for registration to user device 125. The response includes the network address and port number of relay device 150-2.

In block 530, video signaling messages are transmitted to the video camera. For example, user device 125 transmits RTSP signaling messages (i.e., video signaling to establish video streaming) to video camera 150-1 via XMPP device 110-1 and relay device 150-2. The RTSP messages are packaged in the XMPP by XMPP device 110-1.

In block 535, a pinhole is opened on a routing device. For example, user device 125 opens a pinhole at routing device 120. For description purposes, it may be assumed that a pinhole is successfully opened.

Referring to FIG. 5B, in block 540, an encrypted video stream is received. For example, in response to the transmitted RTSP signaling messages, user device 125 receives an encrypted video stream from video camera 150-1 via relay device 150-2, XMPP device 110-1, and the pinhole opened at routing device 120. The video stream is transported as an encrypted RTP/UDP video stream.

In block 545, the encrypted video stream is decrypted using the encryption key. For example, user device 125 decrypts the encrypted RTP/UDP video stream using the encryption key obtained in block 510.

Although FIGS. 5A and 5B illustrate an exemplary process 500 for receiving streaming content, process 500 may include additional operations, fewer operations, and/or different operations than those illustrated in FIGS. 5A and 5B and described herein.

According to an exemplary embodiment, a streaming system allows a user to receive streaming content at a remote location based on opening a port on network interface device located at the customer's premises.

FIGS. 6A-6D are diagrams illustrating an exemplary messaging flow performed by an exemplary embodiment of the security streaming system. The exemplary process is described in relation to the elements illustrated in FIG. 1B.

The messages described and the data or information included therein are exemplary. According to other implementations, the streaming system may use different types of messages and/or include different data or information. Additionally, or alternatively, although the exemplary process describes a particular device performing a step or an act of the process, the step or act may, alternatively be performed by another device, or some combination of devices. Although not specifically described, messages may be encrypted using, for example, Secure Sockets Layer (SSL) or Transport Layer Security (TLS).

According to this scenario, assume that the user of mobile device 125, while at remote location 115, wishes to receive streaming content from video camera 150 located at the user's premises 140. According to other scenarios, the user of mobile device 125 may view the streaming content via a server (e.g., a Web server device).

Figure 6A:
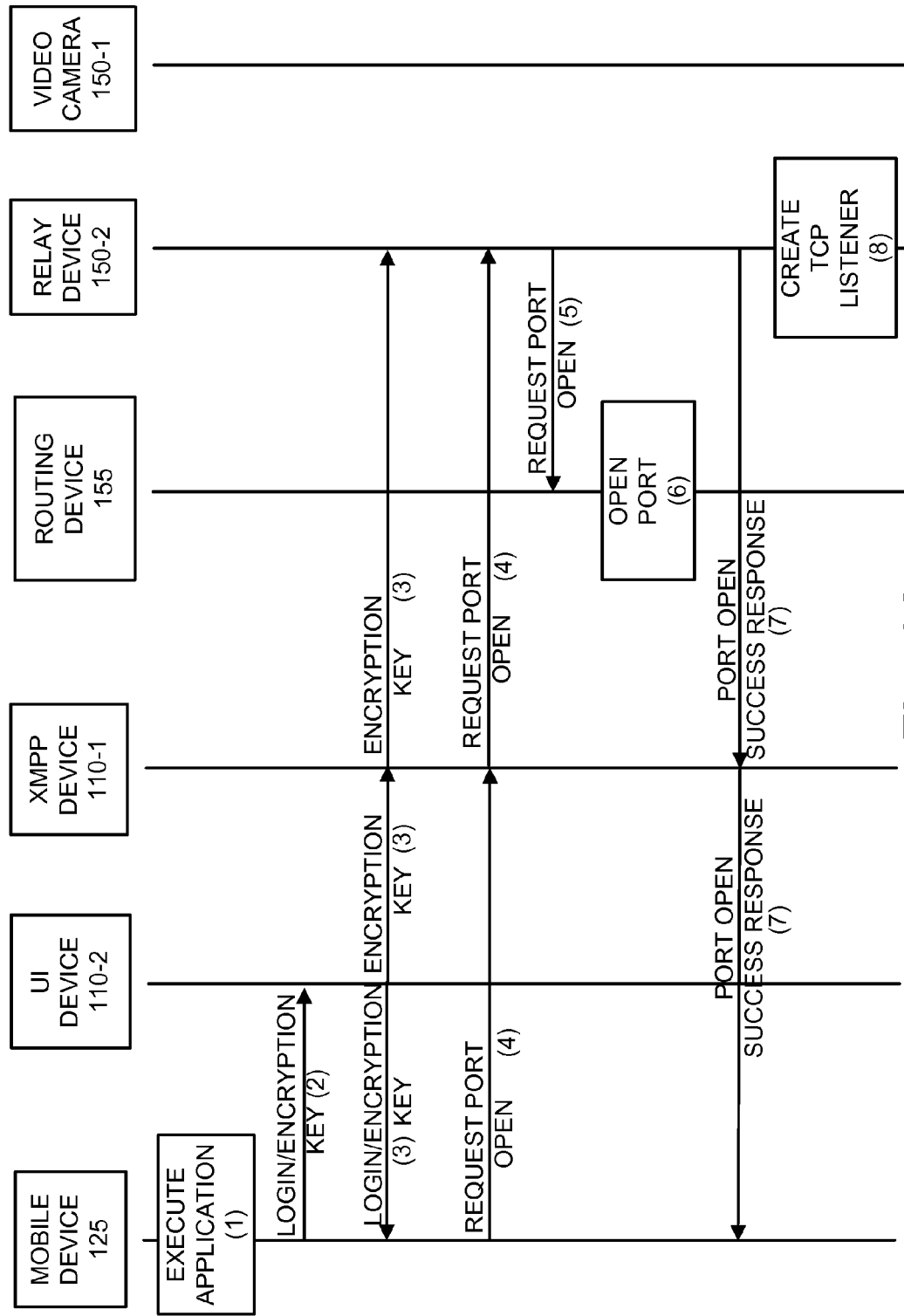

Referring to FIG. 6A, in step (1), the user executes software (e.g., a browser) that allows the user to connect to UI device 110-2.

In step (2), mobile device 125 transmits a request to obtain login information for XMPP device 110-1 and an encryption key. In step (3), UI device 110-2 transmits the login information and an encryption key to mobile device 125.

In step (4), UI device 110-2 transmits the encryption key to relay device 150-2 via XMPP device 110-1. In step (4), mobile device 125 logs on to XMPP server 110-1 using the login information. Mobile device 125 transmits a request to open a port on routing device 155 to relay device 150-2. As further illustrated, XMPP device 110-1 transmits the request to relay device 150-2.

In step (5), in response to receiving the request, relay device 150-2 transmits a request to open the port to routing device 155. In step (6), routing device 155 opens a port (e.g., a Transmission Control Protocol (TCP) port). In step (7), relay device 150-2 transmits a port open success response to XMPP 110-1, which is communicated to mobile device 125. In step (8), relay device 150-2 creates a TCP Listener that provides a method to listen for and accept incoming connection requests, etc.

Figure 6B:
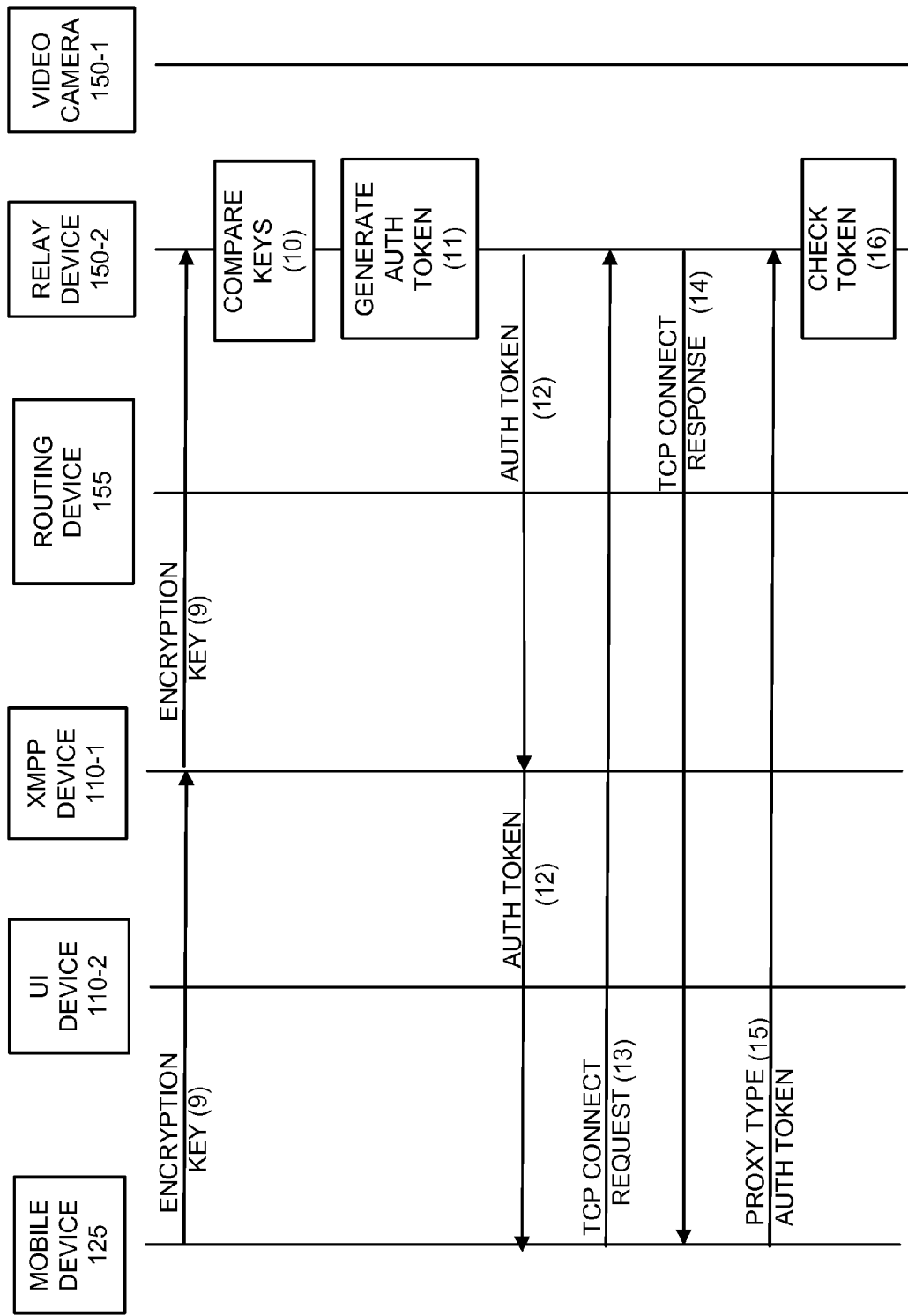

Referring to FIG. 6B, in step (9), mobile device 125 transmits the encryption key and a request for authentication. In step (10), relay device 150-1 compares the encryption key received at step (3) to the encryption key received at step (9). Assuming the encryption keys match, in step (11), relay device 150-2 generates a random authentication token. In step (12), relay device 150-2 transmits the authentication token to mobile device 125.

In step (13), mobile device 125 transmits a TCP connect request to relay device 150-2. In step (14), relay device 150-2 transmits a TCP connect response to mobile device 125. In step (15), mobile device 125 transmits a proxy type identifier and the authentication token to relay device 150-2. The proxy type identifier indicates to relay device 150-2 a type of proxy service to be provided. For example, depending on the user interface (UI) endpoint (e.g., a mobile iPhone operation system (iOS) device, a web device, etc.) that provides the video stream to the user, the video stream is packaged differently. For example, if the UI endpoint is a mobile iOS device, relay device 150-2 selects and provides a proxy service that packages the video stream as a Motion Joint Photographic Experts Group (MJPEG) over the Hypertext Transfer Protocol (HTTP) video stream. In contrast, if the UI endpoint is a web device, relay device 150-2 selects and provides a proxy service that packages the video stream as, for example, an RTSP over TCP video stream.

Figure 6C:
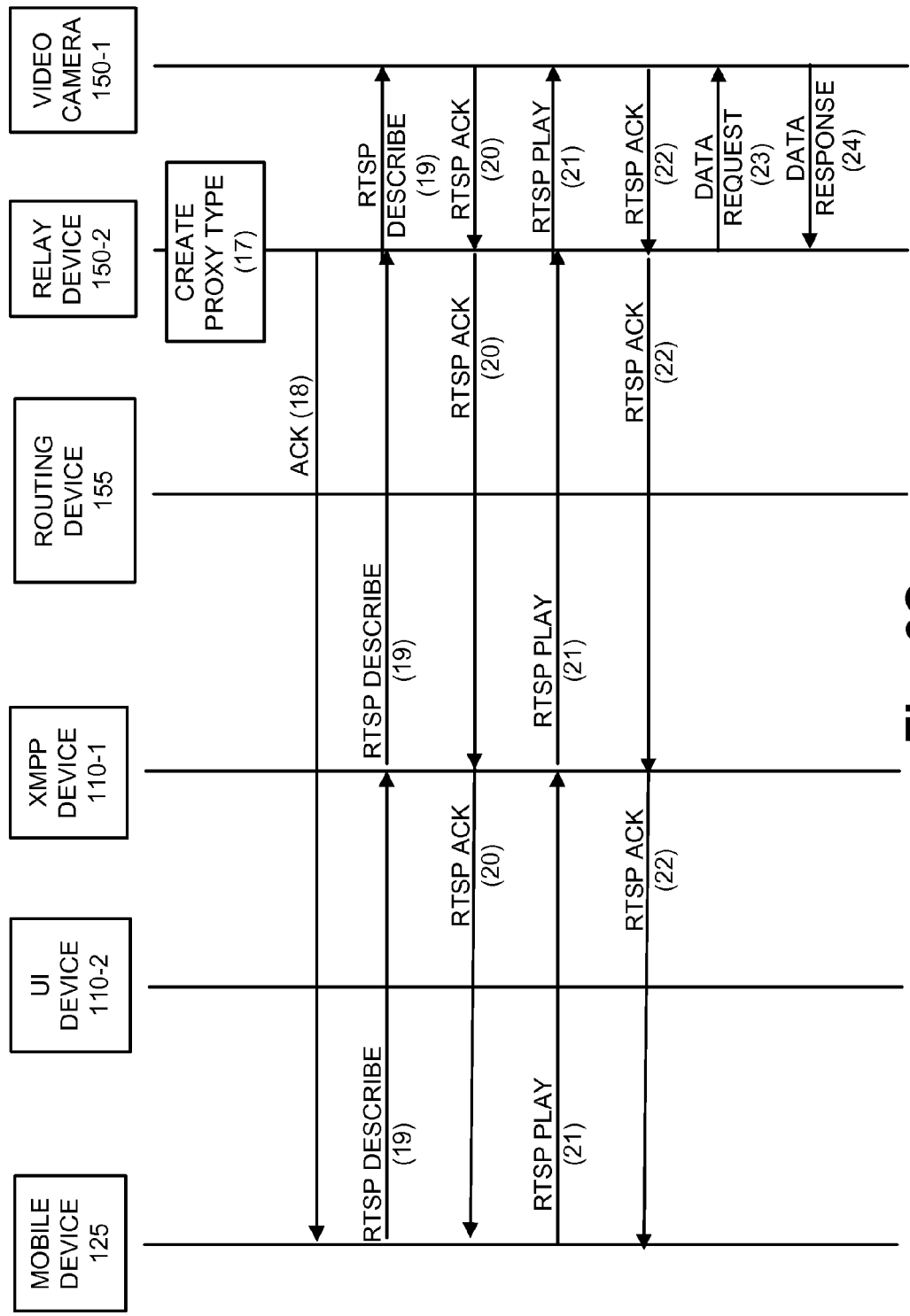

In step (16), relay device 150-2 validates the authentication token. Referring to FIG. 6C, assuming the authentication token is validated, in step (17), relay device 150-2 creates or instantiates a proxy type based on the end user interface device. According to an exemplary embodiment, with knowledge of the UI endpoint, relay device 150-2 creates a proxy. The proxy manages, for example, the transformation, transmission, and encoding of the signaling and video streaming. In step (18), relay device 150-2 transmits an acknowledgment to indicate validation of the authentication token and the creation of the proxy.

In steps (19) through (22), mobile device 125 and video camera 150-1 communicate via XMPP device 110-1 and relay device 1 device 150-2. For example, mobile device 125 and video camera 150-1 exchange RTSP messages to establish a media session for video streaming from video camera 150-1 to mobile device 125. As illustrated, mobile device 125 transmits Describe, Setup, and Play request messages of the RTSP. XMPP device 110-1 packages the RTSP messages in the XMPP.

In step (23), relay device 150-2 transmits a data request for the video stream to video camera 150-1. In step (24), video camera 150-1 streams (e.g., raw data) to relay device 150-2.

Referring to FIG. 6D, in step (25), relay device 150-2 provides the proxy service created in step (17). For example, relay device 150-2 packages the video stream in a suitable format to be viewed by the user via the UI endpoint (e.g., mobile device 125). Relay device 150-2 also encrypts the video stream using the encryption key obtained in step (3). For example, as illustrated for step (26), relay device 150-2 transmits the video stream as an encrypted RTP/TCP video stream to mobile device 125. In step (27), mobile device 125 decrypts the encrypted RTP/TCP video stream using the encryption key obtained in step (3). The user of mobile device 125 watches the video stream via the application. Although not illustrated, once the user is finished watching the video stream, mobile device 125 transmits an RTSP Teardown message to video camera 150-1 in order to stop the streaming video, which is subsequently acknowledged by an RTSP ACK message from video camera 150-1.

While FIGS. 6A-6D are messaging diagrams pertaining to another exemplary process performed by an exemplary embodiment of the streaming system, according to other scenarios, the message(s) transmitted and/or received may be different, and/or the step(s) or act(s) described may be different.

Figure 7A:
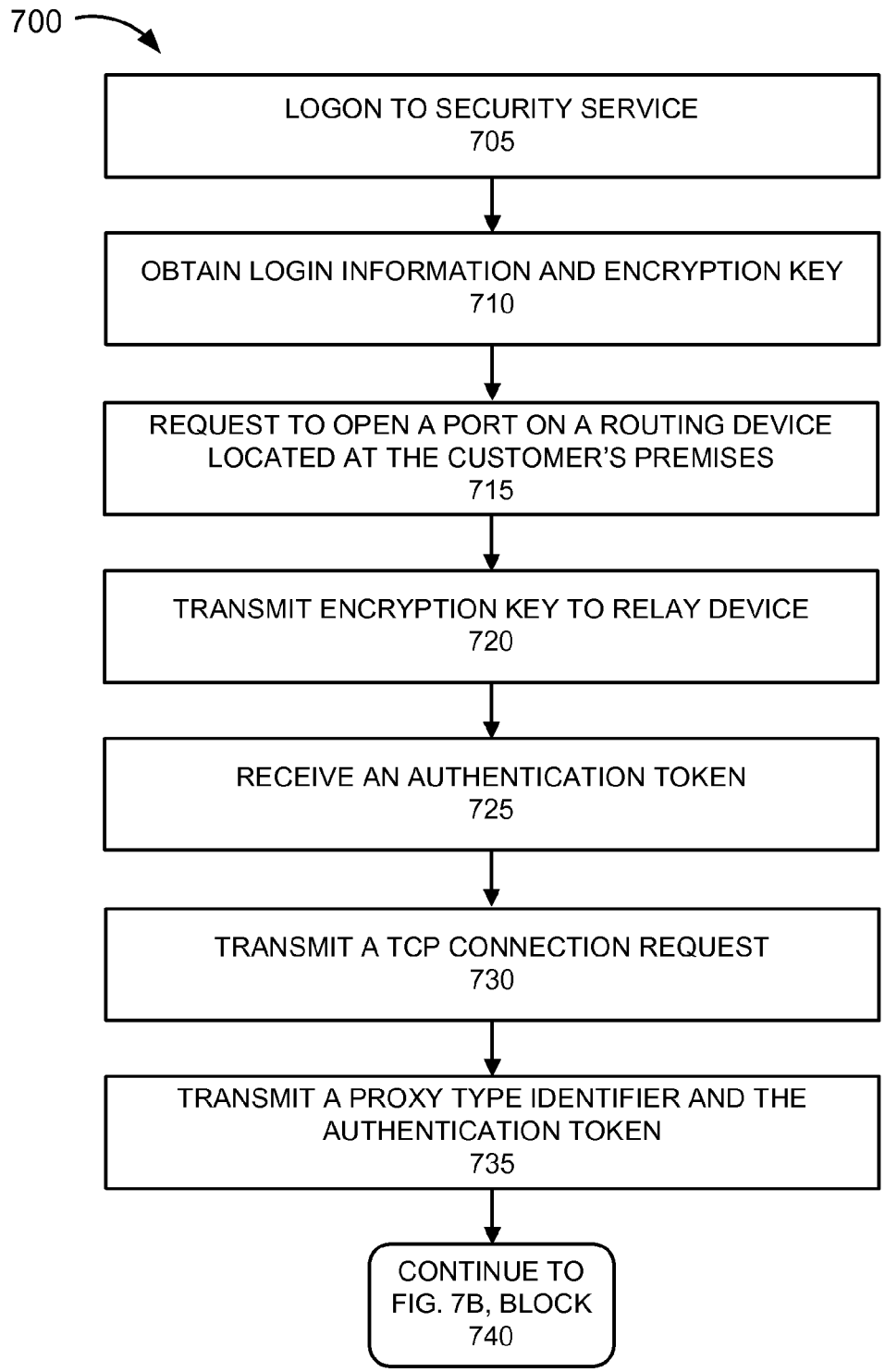
FIGS. 7A and 7B are flow diagrams illustrating another exemplary process pertaining to an exemplary embodiment of the streaming system.
Figure 7B:
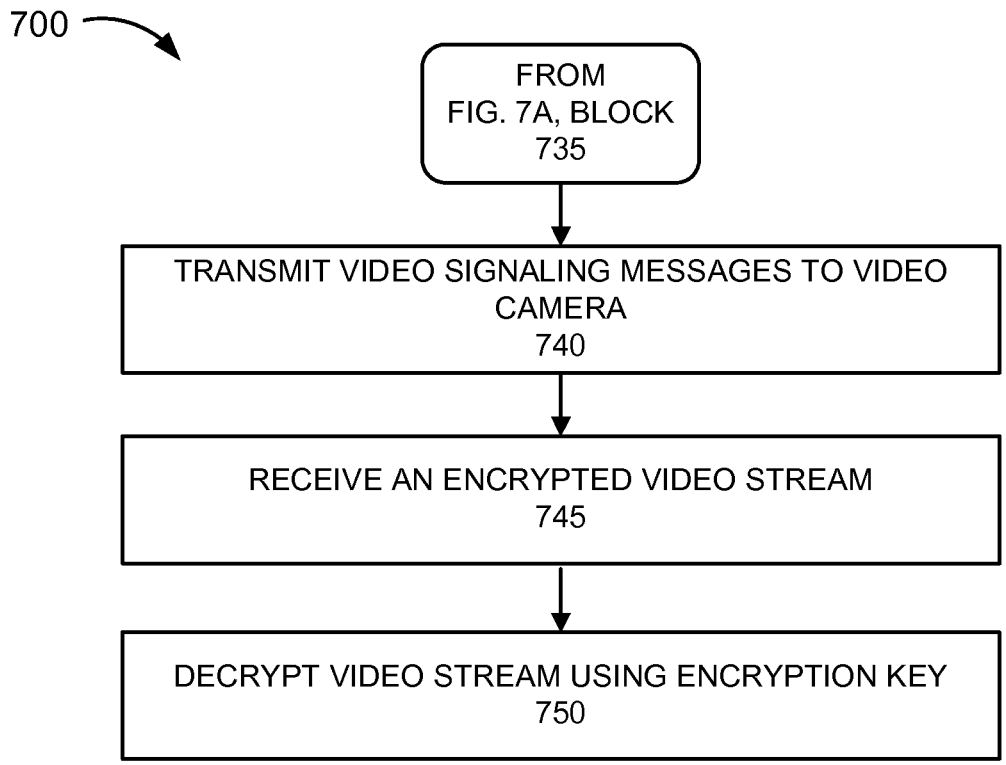

FIGS. 7A and 7B are flow diagrams illustrating another exemplary process pertaining to an exemplary embodiment of the streaming system. A step described in process 700 is performed by one of the devices illustrated in FIG. 1A. For example, processor 405 of user device 125 may execute software 415 to perform the step described.

Process 700 begins with logging on to a security service (block 705). For example, user device 125 executes software (e.g., an application). User device 125 establishes a communication link with UI device 110-2 of network 105 and logs into UI device 110-2.

In block 710, an encryption key and login information is obtained. For example, user device 125 request login information for XMPP device 110-1 and an encryption key. User device 125 obtains the login information and the encryption key.

In block 715, a request to open a port on a routing device located at the customer's premises is transmitted. For example, user device 125 transmits a request to open a port on routing device 155. The request is transmitted to relay device 150-2 via XMPP device 110-1. Relay device 150-2 communicates to routing device 155 to open the port (e.g., a TCP port). User device 125 receives a message from relay device 150-2 via XMPP 110-1 indicating the success of failure of the port open request. For description purposes, it may be assumed that the port open request is successfully completed.

In block 720, an encryption key is transmitted to a relay device. For example, user device 125 transmits the encryption key, obtained in block 710, to relay device 150-2. As previously described, relay device 150-2 compares the encryption keys to confirm that the encryption keys are the same. In response to confirming that the encryption keys are the same, relay device 150-2 generates an authentication token and transmits the authentication token to user device 125 via XMPP device 110-1. In block 725, an authentication token is received. For example, user device 125 receives the authentication token.

In block 730, a TCP connection request is transmitted. For example, in response to receiving the authentication token, user device 125 transmits a TCP connection request to relay device 150-2 to establish a TCP connection. User device 125 receives a TCP response indicating establishment of a TCP connection.

In block 735, a proxy type identifier and the authentication token is transmitted. For example, in response to receiving the TCP response (e.g., indicating establishment of a TCP connection), user device 125 generates a message that includes a proxy type identifier and the authentication token. As previously described, the proxy type identifier indicates to relay device 150-2 a type of proxy service.

Referring to FIG. 7B, in block 740, video signaling messages are transmitted to the video camera. For example, user device 125 transmits RTSP signaling messages (i.e., video signaling to establish video streaming) to video camera 150-1 via XMPP device 110-1, relay device 150-2, and the opened port on routing device 155. The RTSP messages are packaged in the XMPP by XMPP device 110-1.

In block 745, an encrypted video stream is received. For example, in response to the transmitted RTSP signaling messages, user device 125 receives an encrypted video stream from video camera 150-1 via relay device 150-2, XMPP device 110-1, and the opened port at routing device 155. The video stream is transported as an encrypted RTP/UDP video stream.

In block 750, the encrypted video stream is decrypted using the encryption key. For example, user device 125 decrypts the encrypted RTP/UDP video stream using the encryption key obtained in block 710.

Although FIGS. 7A and 7B illustrate an exemplary process 700 for receiving streaming content, process 700 may include additional operations, fewer operations, and/or different operations than those illustrated in FIGS. 7A and 7B and described herein.

FIG. 8 is a diagram illustrating exemplary elements (e.g., logic) for the devices illustrated in FIG. 1A. In contrast to FIG. 1B, network devices 110 also include a media device 110-4. Media device 110-4 includes a network device that provides streaming services. For example, media device 110-4 may be implemented as a media server. According to this exemplary environment, media device 110-4 provides video streams from video camera 150-1 to mobile device 125.

According to an exemplary use case, mobile device 125 establishes a communication link with media device 110-4. Additionally, a communication link is established between media device 110-4 and relay device 150-2. The video stream is transmitted via relay device 150-2 and media device 110-4 to mobile device 125. According to this embodiment, network 105 uses additional resources to provide video streaming to customers.

Figure 9:
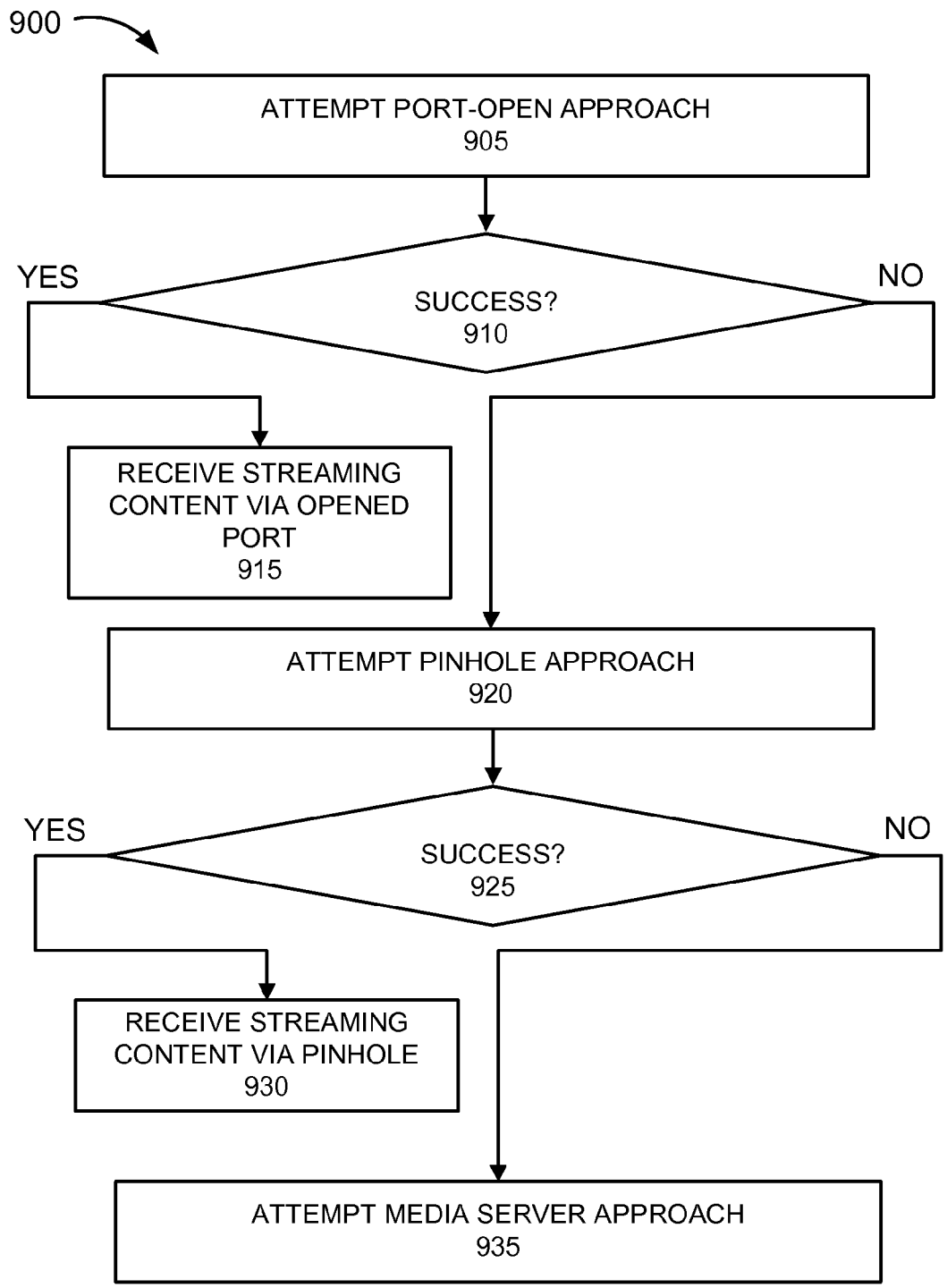
FIG. 9 is a flow diagram illustrating yet another exemplary process pertaining to an exemplary embodiment of the streaming system.

According to an exemplary embodiment, user device 125 selects one of the above-mentioned streaming approaches based on a cascaded model. FIG. 9 is a flow diagram illustrating yet another exemplary process 900 pertaining to an exemplary embodiment of the streaming system. According to process 900, user device 125 selects one of the above-mentioned approaches, and if a failure occurs (e.g., due to the capabilities or configuration of a routing device, etc.), user device 125 selects another streaming approach. For purposes of description, one approach is referred to as the port-open approach. The port-open approach has been described in relation to FIGS. 6A-6D and elsewhere in this description. Additionally, for purposes of description, another approach is referred to as the pinhole approach. The pinhole approach has been described in relation to FIGS. 2A-2C and elsewhere in this description. Additionally, for purposes of description, yet another approach is referred to as the media server approach. The media server approach has been described in relation to FIG. 8 and elsewhere in this description.

According to an exemplary embodiment, the port-open approach may be selected as the first approach to attempt to receive streaming content. According to another exemplary embodiment, the pinhole approach may be selected as the first approach to attempt to receive streaming content.

A step described in process 900 is performed by one of the devices illustrated in FIG. 1A. For example, processor 405 of user device 125 may execute software 415 to perform the step described.

Process 900 begins with a port-open approach attempt (block 905). For example, user device 125 attempts to receive streaming content from video camera 150-1 according to the port-open approach.

In block 910, it is determined whether the port-open approach is successful. For example, user device 125 determines whether the port-open approach is successful. User device 125 determines that the port-open approach is successful when user device 125 receives streaming content from video camera 150-1. Conversely, user device 125 determines that the port-open approach is not successful when user device 125 does not receive streaming content from video camera 150-1. By way of example, user device 125 may receive a port open failure response from relay device 150-2. This failure may be due to the capabilities of routing device 155. For example, the user may use a routing device 155 at the customer's premises 140 that does not permit, accept, understand, etc., a port open command. User device 125 may determine that the port open approach has failed based on other error messages received, expiration of time out periods, etc.

If it is determined that the port-open approach is successful (block 910-YES), then streaming content is received via the open port (block 915). For example, user device 12 receives the streaming content from video camera 150-1 and via the opened port of relay device 150-2. If it is determined that the port-open approach is not successful (block 910-NO), then a pinhole approach is attempted (block 920). For example, user device 125 attempts to receive streaming content from video camera 150-1 according to the pinhole approach.

In block 925, it is determined whether the pinhole approach is successful. For example, user device 125 determines whether the pinhole approach is successful. User device 125 determines that the pinhole approach is successful when user device 125 receives streaming content from video camera 150-1. Conversely, user device 125 determines that the pinhole approach is not successful when user device 125 does not receive streaming content from video camera 150-1. By way of example, user device 125 may not be able to open a pinhole on routing device 120. According to one implementation, routing device 120 may not provide a failure response to the request to open a pinhole. According to such an implementation, user device 125 may determine that the pinhole approach is not successful based on an expiration of a waiting period for the streaming content. User device 125 may determine that the pinhole approach has failed based on error messages received, etc.

If it is determined that the pinhole approach is successful (block 925-YES), then steaming content is received via the pinhole (block 930). For example, user device 125 receives the streaming content from video camera 150-1 and via the pinhole on routing device 120. If it is determined that the pinhole approach is not successful (block 925-NO), then a media server approach is attempted (block 935). For example, user device 125 establishes a communication link with media device 110-4 for receiving streaming content from video camera 150-1.

Although FIG. 9 illustrates an exemplary process 900 for receiving streaming content, process 900 may include additional operations, fewer operations, and/or different operations than those illustrated in FIG. 9 and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A, 5B, 7A, 7B, and 9, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and hardware. For example, a process or a function may be implemented as "logic" or as a "component." This logic or this component may include hardware (e.g., processor 405, etc.) or a combination of hardware and software (e.g., software 415). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 410. The data and/or information may be executed to perform processes or provide functions, as described herein.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
    logging on, by a user device, to a network that authenticates customers and provides a streaming service for content pertaining to video cameras of security systems located at customers' premises;
    transmitting, by the user device, subsequent to a user of the user device successfully logging on to the network and being authenticated, one of a request to open a port at a first wireless router located at the customer's premises or a request to open a pinhole at a second wireless router located at a location remote to the customer's premises, wherein the user and the user device are located at the remote location;
    determining, by the user device, whether a success or a failure occurred as to one of opening the port or opening the pinhole based on receipt of a response to the one of the request to open the port or the request to open the pinhole, or based on an expiration of a timeout period;
    receiving, by the user device, streaming content from a video camera of a security system located at the customer's premises, subsequent to the success of the one of opening the port or opening the pinhole; and
    transmitting, by the user device, the request to open the pinhole at the second wireless router based on determining that the transmitted request to open the port failed; or
    transmitting, by the user device, the request to open the port at the first wireless router based on determining that the transmitted request to open the pinhole failed, wherein when opening the port is successful, the method further comprises:
        transmitting a proxy type identifier and an authentication token to a relay device located at the customer's premises, wherein the proxy type identifier indicates a type of proxy service to be provided by the relay device for the user device, and wherein the proxy service includes encoding and packaging the streaming content from the video camera at the customer's premises to the user device based on an encoding and a protocol corresponding to the proxy type identifier.

2. The method of claim 1, further comprising:
    transmitting, by the user device, media session signaling to the video camera via the relay device located at the customer's premises; and
    receiving, by the user device, an acknowledgement that the media session has been set up, and wherein the transmitting the request to open the pinhole comprises:
    transmitting the request to open the pinhole subsequent to receiving the acknowledgement.

3. The method of claim 1, further comprising:
    transmitting, by the user device, a request to receive the streaming content from the video camera located at the customer's premises via a media server of the network, in response to determining that a failure occurred as to receiving the streaming content based on the request to open the port and determining that a failure occurred as to receiving the streaming content based on the request to open the pinhole.

4. The method of claim 1, further comprising:
    transmitting, by the user device, a first encryption key to the relay device, prior to transmitting the request to open the port; and
    transmitting, by the user device, a second encryption key and a request to authenticate, to the relay device, subsequent to receiving an indication that opening the port is successful.

5. The method of claim 1, further comprising:
    using a Real Time Streaming Protocol (RTSP) over an Extensible Messaging and Presence Protocol (XMPP) for stream signaling via a first connection of a first connection path between the user device and the video camera; and
    using a Real Time Transport Protocol (RTP) for the streaming content via a second connection of a second connection path between the user device and the video camera, wherein the first connection path is different from the second connection path.

6. The method of claim 1, further comprising:
    creating a Transport Control Protocol listener at the relay device located at the customer's premises, in response to successfully opening the port at the first wireless router; and
    receiving the proxy type identifier from the user device.

7. The method of claim 1, further comprising:
    registering, by the user device, a network address and a port number of the user device with a registration device of the network;

transmitting, by the user device, a registration request to the relay device located at the customer's premises, wherein the registration request requests that the relay device register with the registration device;

registering, by the relay device, a network address and a port number of the relay device in response to receiving the registration request;

mapping, by the registration device, the network address and the port number of the user device with the network address and the port number of the relay device; and transmitting the network address and the port number of the relay device to the user device subsequent to the mapping.

8. The method of claim 1, further comprising:

receiving, by the relay device, the request to open the port at the first wireless router, from the user device; and transmitting, by the relay device, a request to open the port to the first wireless router, in response to receiving the request from the user device.

9. A streaming system comprising:
a user device comprising:
   a first communication interface;
   a memory that stores first instructions; and
   a first processor to execute the first instructions to:
     log on, based on receipt of login information from a user, to a network that authenticates customers and provides a streaming service for content pertaining to video cameras of security systems located at customers' premises;
     transmit, via the first communication interface, subsequent to the user successfully logging on to the network and being authenticated via the user device, one of a request to open a port at a first wireless router located at the customer's premises or a request to open a pinhole at a second wireless router located at a location remote to the customer's premises, wherein the user and the user device are located at the remote location; and
     determine whether a success or a failure occurred as to one of opening the port or opening the pinhole based on receipt of a response to the one of the request to open the port or the request to open the pinhole, or based on an expiration of a timeout period;
     receive, via the first communication interface, streaming content from a video camera of a security system located at the customer's premises, subsequent to the success of the one of the opening the port or the opening the pinhole; and
     transmit, via the first communication interface, the request to open the pinhole at the second wireless router based on a determination that the transmitted request to open the port failed; or
     transmit, via the first communication interface, the request to open the port at the first wireless router based on a determination that the transmitted request to open the pinhole failed, wherein when the request to open the port is successful, the first processor further executes the first instructions to:
     transmit, via the first communication interface, a proxy type identifier and an authentication token to a relay device located at the customer's premises, wherein the proxy type identifier indicates a type of proxy service to be provided by the relay device for the user device, and wherein the proxy service includes encoding and packaging the streaming content from the video camera at the customer's premises to the user device based on an encoding and a protocol corresponding to the proxy type identifier.

10. The streaming system of claim 9, further comprising:
the relay device, wherein the relay device comprises:
   a second communication interface;
   a second memory that stores second instructions; and
   a second processor to execute the second instructions to:
     receive, via the second communication interface, the request to open the port at the first wireless router;
     transmit, via the second communication interface, the request to open the port to the first wireless router located at the customer's premises; and
     create a Transport Control Protocol listener, in response to a determination that the port is opened.

11. The streaming system of claim 10, further comprising:
an Extensible Messaging and Presence Protocol (XMPP) device of the network, comprising:
   a third communication interface;
   a third memory that stores third instructions; and
   a third processor to execute the third instructions to:
     receive, via the third communication interface, Real Time Streaming Protocol (RTSP) signaling messages from the user device; and
     transmit, via the third communication interface, the RTSP signaling messages over the XMPP, and
wherein the first processor of the user device to further execute the first instructions to:
   receive, via the first communication interface, Real Time Transport Protocol (RTP) over Transport Control Protocol (TCP) streaming content from the relay device via an opened port at the first wireless router.

12. The streaming system of claim 11, wherein the first processor of the user device to execute the first instructions to:
   transmit, via the first communication interface, a request to the XMPP device to register the relay device; and
   receive, via the first communication interface, a response to the request to register that includes an address and a port number associated with the relay device.

13. The streaming system of claim 10, wherein the second processor of the relay device to further execute the second instructions to:
   create a Transport Control Protocol listener in response to successfully opening the port at the first wireless router; and
   receive, via the second communication interface, the proxy type identifier from the user device.

14. The streaming system of claim 9, further comprising:
the relay device, wherein the relay device comprises:
   a second communication interface;
   a second memory that stores second instructions; and
   a second processor to execute the second instructions to:
     receive, via the second communication interface, a request to register a network address and a port number of the relay device to a registrar device;
     transmit, via the second communication interface, a response that includes the network address and the port number to the registrar device;
     transmit, via the second communication interface, to the video camera and from the user device, Real Time Streaming Protocol (RTSP) over Extensible Messaging and Presence Protocol (XMPP) stream signaling messages; and
     transmit, via the second communication interface, to the user device and via an opened pinhole, Real Time Transport Protocol (RTP) over Transport Control Protocol (TCP) streaming content.

15. The streaming system of claim 9, wherein the first processor of the user device to execute the first instructions to:
- transmit, via the first communication interface, media session signaling to the video camera via the relay device located at the customer's premises; and
- receive, via the first communication interface, an acknowledgement that the media session has been set up, and wherein when transmitting the request to open the pinhole, the first processor of the user device executes the instructions to:
- transmit, via the first communication interface, the request to open the pinhole subsequent to receiving the acknowledgement.

16. The streaming system of claim 9, wherein the user device is a smartphone.

17. A non-transitory storage medium storing instructions executable by a computational device, wherein the instructions comprise instructions to:
- log on, based on receipt of login information from a user, to a network that authenticates customers and provides a streaming service for content pertaining to video cameras of security systems located at customers' premises;
- transmit, subsequent to the user successfully logging on to the network and being authenticated, one of a request to open a port at a first wireless router located at the customer's premises or a request to open a pinhole at a second wireless router located at a location remote to the customer's premises;
- determine whether a success or a failure occurred as to one of opening the port or opening the pinhole based on receipt of a response to the one of the request to open the port or the request to open the pinhole, or based on an expiration of a timeout period;
- receive streaming content from a video camera of a security system located at the customer's premises, subsequent to the success of the one of opening the port or opening the pinhole; and
- transmit the request to open the pinhole at the second wireless router based on a determination that the transmitted request to open the port failed; or
- transmit the request to open the port at the first wireless router based on a determination that the transmitted request to open the pinhole failed, wherein when the request to open the port is successful, the instructions comprise further instructions to:
- transmit a proxy type identifier and an authentication token to a relay device located at the customer's premises, wherein the proxy type identifier indicates a type of proxy service to be provided by the relay device for the user device, and wherein the proxy service includes encoding and packaging the streaming content from the video camera at the customer's premises to the user device based on an encoding and a protocol corresponding to the proxy type identifier.

18. The non-transitory storage medium of claim 17, wherein the instructions comprise further instructions to:
- transmit media session signaling to the video camera via the relay device located at the customer's premises; and
- receive an acknowledgement that the media session has been set up, and wherein the instructions to transmit the request to open the pinhole further comprise instructions to:
- transmit the request to open the pinhole subsequent to receiving the acknowledgement.

19. The non-transitory storage medium of claim 17, wherein the instructions comprise further instructions to:
- use a Real Time Streaming Protocol (RTSP) over an Extensible Messaging and Presence Protocol (XMPP) for stream signaling via a first connection of a first connection path between the computational device and the video camera; and
- use a Real Time Transport Protocol (RTP) for the streaming content via a second connection of a second connection path between the computational device and the video camera, wherein the first connection path is different from the second connection path.

20. The non-transitory storage medium of claim 17, wherein the instructions comprise further instructions to:
- transmit a first encryption key to the relay device, prior to transmitting the request to open the port; and
- transmit a second encryption key and a request to authenticate, to the relay device, subsequent to receiving an indication that opening the port is successful.

* * * * *